United States Patent [19]
Blumentritt et al.

[11] Patent Number: 4,805,993
[45] Date of Patent: Feb. 21, 1989

[54] METHOD OF ASSEMBLING OPTICAL COMPONENTS AND ARRANGEMENT THEREFOR

[75] Inventors: Martin Blumentritt, Königsbronn; Hermann Gerlinger, Aalen-Ebnat; Horst Schneider, Königsbronn; Franz Glück, Aalen, all of Fed. Rep. of Germany

[73] Assignee: Carl-Zeiss-Stiftung, Heidenheim, Fed. Rep. of Germany

[21] Appl. No.: 25,718

[22] Filed: Mar. 13, 1987

[30] Foreign Application Priority Data

Mar. 14, 1986 [DE] Fed. Rep. of Germany ....... 3608484

[51] Int. Cl.$^4$ .............................................. G02B 27/00
[52] U.S. Cl. .................................... 350/321; 350/320; 350/96.20; 350/253

[58] Field of Search ............... 350/320, 321, 252, 253, 350/96.2, 630, 631, 611; 156/60, 62.2, 65, 66, 89, 91, 290, 293, 299; 356/328, 330

[56] References Cited

U.S. PATENT DOCUMENTS

| | | | |
|---|---|---|---|
| 4,227,950 | 10/1980 | Spycher | 350/320 |
| 4,357,072 | 11/1982 | Goodfellow et al. | 350/96.20 |
| 4,693,555 | 9/1987 | Arai et al. | 350/253 |
| 4,702,556 | 10/1987 | Ishii et al. | 350/320 |

Primary Examiner—John K. Corbin
Assistant Examiner—Loha Ben
Attorney, Agent, or Firm—Walter Ottesen

[57] ABSTRACT

For a durable, strong fixation of adjusted optical components by means of a self-hardening substance, the fixation is distributed over at least two mutually independent fixations and the parts used for the fixation are configured and dimensioned in such a manner that the resultant volumes or layer thicknesses of the self-hardening substance are optimal.

27 Claims, 3 Drawing Sheets

METHOD OF ASSEMBLING OPTICAL COMPONENTS AND ARRANGEMENT THEREFOR

FIELD OF THE INVENTION

The invention relates to a method for assembling an optical component in a mechanical frame in which the adjusted optical component or its holder is connected to the mechanical frame only via an adjusting device. The adjusted optical component is permanently fixed to the frame by means of a substance that self-hardens, after which the adjusting device is removed. An arrangement for performing the method is also disclosed.

BACKGROUND OF THE INVENTION

U.S. patent application Ser. No. 478,891 (filed Mar. 25, 1983) now abandoned, and U.S. patent application Ser. No. 779,878 (filed Sept. 17, 1985) now U.S. Pat. No. 4,709,989, are incorporated herein by reference and disclose a method and an apparatus for adjusting and mounting optical components in optical devices. The optical component is connected to the device during the adjusting process only by means of an adjusting apparatus that is not part of the device. After the adjusting operation, the optical component or its mount is joined to the device by a liquid or paste-like substance, which self-hardens with little change in volume. The optical component or its mount and the device are configured for this purpose such that between them a form-tight, force-tight or adhering-tight connection is provided. After the optical component has been permanently fixed, the adjusting device is removed.

To assure that the optical component is sufficiently moveable for the adjusting operation, there must also be enough space between it, or its mount, and the device, where the connection with the self-hardening substance takes place. The relatively large volume or layer thicknesses required thereby have the effect that during the self-hardening process, slight misadjustments can again occur, and that in the fixed state, because of the thermal coefficients of expansion which are not precisely alike, slight misadjustments can arise from thermal influences. The known method therefore has the disadvantage of being insufficiently reliable in view of the very stringent requirements for adjustment accuracy and long-term stability.

SUMMARY OF THE INVENTION

It is an object of the invention to provide a method of assembling optical components wherein extremely stringent demands for accuracy of adjustment and long-term stability can be met notwithstanding a large freedom of movement during adjustment. It is also an object of the invention to provide an arrangement for carrying out the method.

The method of the invention is for assembling an optical component in a frame with the optical component connected to the frame only by means of an adjusting device. The method includes the steps of: providing a part disposed between the optical component and the frame; applying a self-hardening substance to the interface of the part and frame thereby establishing a permanent first fixation; and, applying a self-hardening substance to the interface of the part and the optical component thereby establishing a permanent second fixation independent of the first fixation, the part being configured and dimensioned so as to provide optimal volume and layer thicknesses for the substance.

According to a feature of the invention, the fixation by means of the self-hardening substance is distributed among at least two independent fixations, and the parts used for the fixations are configured and dimensioned such that optimal values in terms of volume or layer thicknesses are attained for this self-hardening substance. Optimal values result from the fact that with very small volumes or layer thicknesses, no sufficiently firm connections are produced, while with large volumes or layer thicknesses, stability over time and thermal stability are not adequately reliable. Distributing the fixation over a plurality of independent fixations can correspond to the different translational and rotational movements during the adjustment. This need not necessarily be the case, however, since the coordinate directions for adjustment and fixation are largely independent of one another.

In an advantageous embodiment, an optical component having a round cross section itself, or the mount or holder plate of which has a round cross section, is mounted in a cylindrical cutout of an assembly plate with a gap for the self-hardening substance, and the assembly plate is disposed on a bearing surface with a thin intermediate layer of the self-hardening substance. By displacing the assembly plate on the bearing surface, large deviations in two directions at right angles to one another can be compensated for, without changing the optimal layer thickness for the self-hardening substance. By disposing the optical component, which itself has a circular cross section or the mount or holder plate of which has a circular cross section, in the cylindrical cutout of the assembly plate, deviations in the third direction can be compensated for. Furthermore, rotation about all three spatial directions is possible.

In a particularly advantageous feature of this embodiment, the optical component or its mount or holder plate is provided on its outer rim with a spherically-shaped surface, the radius of which is selected to be a quantity equal to the radius of the cylindrical cutout in the mounting plate less the thickness of the gap for the self-hardening substance. The center point of this embodiment is located in the center of the optical component or its mount or holder plate. Consequently, the cross section of the gap is independent of the rotations including the rotations about the two spatial directions in which the assembly plate is displaceable. If no displacement in the direction at right angles to the assembly plate is necessary (because this can be taken care of by the movement of other optical elements), then the cutout in the assembly plate and the outer rim of the optical component, or of its mount or holder plate, can be configured in the manner of a ball socket, so that a rotation about all three spatial directions is possible, with a uniform and constant cross section of the gap for the self-hardening substance.

In another advantageous feature of the invention, an optical component, which either itself has two preferably parallel mounting faces, or the mount or holder plate of which has such faces, is disposed between two assembly blocks with thin intermediate layers of the self-hardening substance, and the assembly blocks are disposed on a support with thin intermediate layers of the self-hardening substance. With this kind of arrangement, displacement in all three spatial directions in space and rotation about two spatial directions is possible.

Displacement and rotation about all three spatial directions is possible in another embodiment, in which an optical component itself, or its mount or holder plate, has two preferably mutually parallel mounting faces. In this embodiment, the optical component is disposed between two first assembly blocks with thin intermediate layers of the self-hardening substance, and the end faces of the first assembly block are disposed between two second assembly blocks with thin intermediate layers of the self-hardening substance. The second assembly blocks are disposed on a support face or frame with thin intermediate layers of the self-hardening substance.

In a further advantageous embodiment of the invention, an optical component, which itself has a mounting face on the back or the mount or holder plate of which has such a mounting face, is disposed on a first block-shaped assembly plate with a thin intermediate layer of the self-hardening substance; the first assembly plate is disposed with a side face on a second block-shaped assembly plate with a thin intermediate layer of the self-hardening substance, and the second assembly plate is disposed with a side face on a base plate or frame with a thin intermediate layer of the self-hardening substance. In this case, arbitrarily large deviations in all three spatial directions and rotations about all three spatial directions can be compensated for, while maintaining optimal layer thickness for the self-hardening substance.

If rotation about one spatial direction is unnecessary and if the optical component has a lateral mounting face, such as in the case of plane mirrors, then it is sufficient for the lateral mounting face to be disposed on a block-shaped assembly plate with a thin intermediate layer of the self-hardening substance, and for the assembly plate to be disposed with a side face on a base plate or frame with a thin intermediate layer of the self-hardening substance.

In all the embodiments, a particularly advantageous feature is the use of densified ceramic as the material for the mounts, holder plates, assembly blocks, assembly plates and/or bearing surfaces or frames, the composition of the ceramic being selected such that its thermal coefficient of expansion is equal to or nearly equal to that of the glass from which the optical components are made.

BRIEF DESCRIPTION OF THE DRAWINGS

The invention will now be described with reference to the drawings, wherein.

DESCRIPTION OF THE PREFERRED EMBODIMENTS OF THE INVENTION

Figure 1:
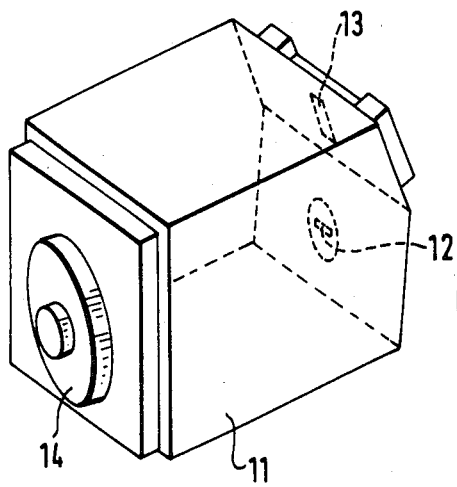
FIG. 1 shows the structure of a spectrometer, as an example of an optical apparatus, for which the invention can be used advantageously.

In FIG. 1, a diode-array spectrometer is shown, which comprises a chassis or frame 11, a slit 12, concave grating 14 and diode array 13. The slit, concave grating and diode array must be adjusted accurately relative to one another and be permanently and tightly fixed. The adjustment and assembly of the slit 12 (shown greatly enlarged) is done in a known manner, in that the slit (for instance etched into a metal plate) is adjusted under observation with a measuring microscope with respect to the bottom face of the frame 11, for example, and is glued into an indentation in the frame. The concave grating 14 and the diode array 13 are initially joined to the frame 11 only via manipulators, and are accurately adjusted with these manipulators in the manner disclosed in U.S. patent applications having Ser. Nos. 478,891 and 779,878 referred to above and incorporated herein by reference. The fixation of the concave grating 14 and the diode array 13 is then performed with the arrangements shown in FIGS. 2 and 3.

Figure 2:
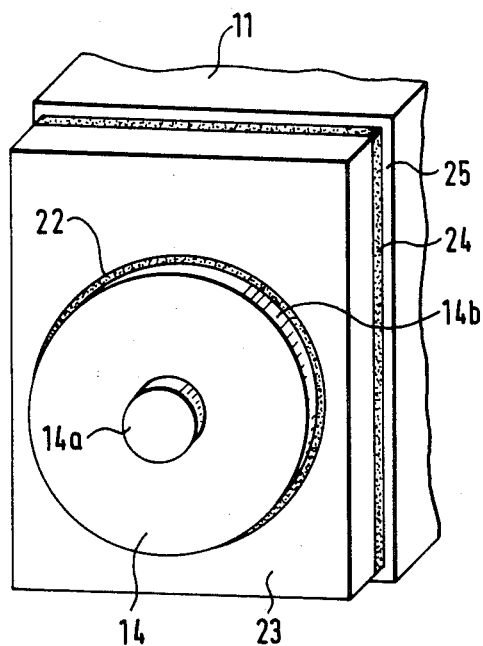
FIG. 2 shows an arrangement for securing an optical component having a round cross section.

In FIG. 2, the concave grating is again indicated with reference numeral 14. On its rear face, the grating 14 has a pin 14a with which it is held by the manipulator. The outer rim 14b of the concave grating 14 is seated with a narrow gap 22 in a cylindrically-shaped cutout of the assembly plate 23. The assembly plate 23 is freely displaceable on the support face 25 of the frame 11 and therefore permits a practically arbitrarily large displacement of the concave grating 14 in the X and Y directions. Inside the cylindrically-shaped cutout in the assembly plate 23, the concave grating 14 is displaceable in the direction of the Z axis. The grating 14 is also arbitrarily rotatable about the Z axis and, depending on the width of the gap 22, the grating can also be rotated to a greater or lesser extent about the X and Y axes.

The gap 22 between the concave grating 14 and the assembly plate 23 and the intermediate layer 24 between the assembly plate 23 and the support face 25 are filled with the self-hardening substance. This can be done before the adjustment, if it is assured that the adjusting process has been completed before the self-hardening process begins. Otherwise, the assembly plate 23 together with the suitable amount of self-hardening substance, is pushed over the outer rim 14b and pressed against the support surface 25 once the adjustment of the concave grating 14 has taken place. By suitably dimensioning the cylindrical cutout in the assembly plate 23 and by the use of suitable amounts of the self-hardening substance, the volume or layer thickness of the latter can be brought to an optimal value.

It is particularly advantageous to provide the outer rim 14b of the concave grating with a curvature in the Z direction as well, so that the outer rim becomes a spherical zone, the center point of which in the Z direction as well is located in the center of the concave grating 14. In this case, relatively large rotations of the concave grating 14 about the Y and X axes are possible without changing the dimensions of the gap.

Figure 3:
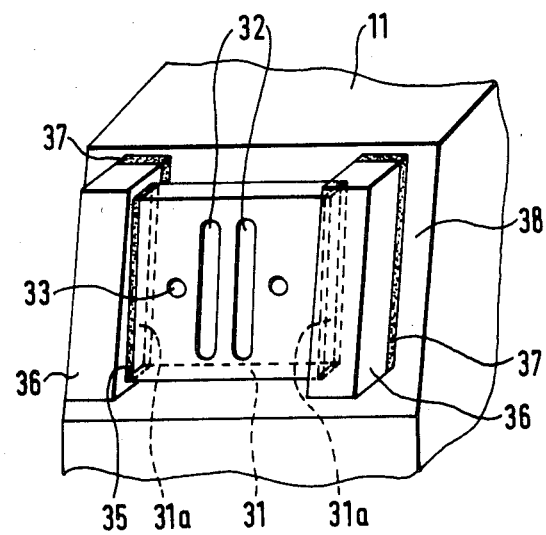
FIG. 3 shows an arrangement for securing a holder plate for an optical component.
Figure 3:
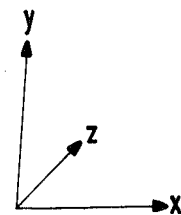

In FIG. 3, the mounting of the diode array is shown, which is glued onto the holder plate 31 below the plane of the drawing. The connection pins (not shown) of the diode array extend through two slots 32, so that the first portion of the electronics, which should be mounted as close as possible to the diode array, is located above the plane of the drawing. For mounting the circuit board required for this purpose, two threaded bushings 33 are glued into the holder plate 31, and stay bolts are screwed into these bushings which at the same time also serve to secure the holder plate 31 to the manipulator during the processes of adjustment and fixation.

The holder plate 31 has mounting faces 31a, onto which, after the adjustment, assembly blocks 36 are placed with thin intermediate layers 35 of the self-hardening substance disposed therebetween. In this method, the assembly blocks 36 are mounted with thin intermediate layers 37 of the self-hardening substance upon the support face 38 of the frame 11 as well. The holder plate 31 thus does not rest on the support surface 38 but instead is spaced apart therefrom so that it can not only be displaced in the X and Y directions and rotated about the Z direction, but also can be displaced in the Z direction and rotated about the X direction. In this way, optimal adjustment is possible for various ranges of the spectrum generated by the concave grating 14 as well.

Figure 4:
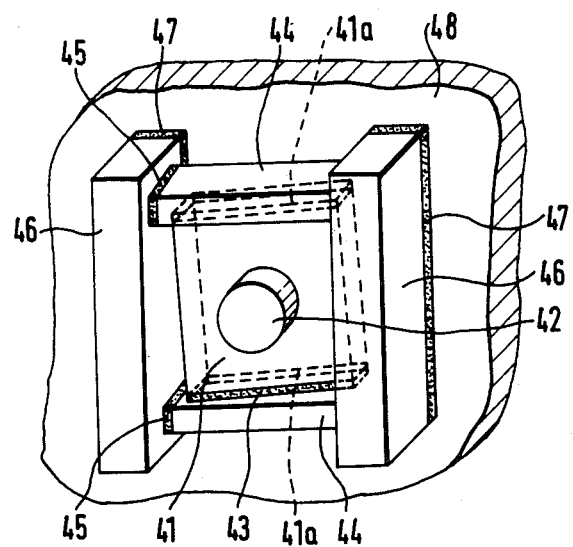
FIG. 4 shows a further arrangement for securing an optical component to a frame.
Figure 4:
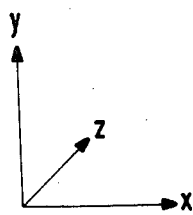

With the arrangement shown in FIG. 3, the diode array is not rotatable only about the Y direction which is also unnecessary in this embodiment. For other applications, in which rotation about the Y direction is also necessary, FIG. 4 shows an embodiment for an optical component 41, for example a mirror, which is displaceable in all three spatial directions and is rotatable about all three spatial directions. The optical component 41, connected to the manipulator via the pin 42, has two mounting faces 41a, onto which, after the adjustment, first assembly blocks 44 are placed with thin intermediate layers 43 of the self-hardening substance. Second assembly blocks 46 are set onto the end faces on these first assembly blocks 44 with thin intermediate layers 45 of the self-hardening substance, and the second assembly blocks are at the same time set onto the support face 48 with thin intermediate layers 47 of the self-hardening substance.

Figure 5:
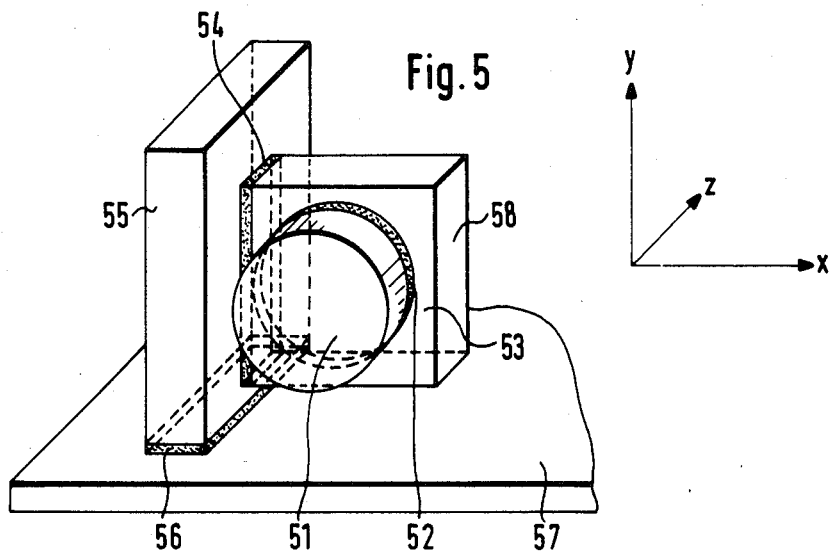
FIG. 5 shows an arrangement for securing an optical component having a rear assembly face; and, FIG. 6 shows an arrangement for securing an optical component having a side assembly face.
Figure 6:
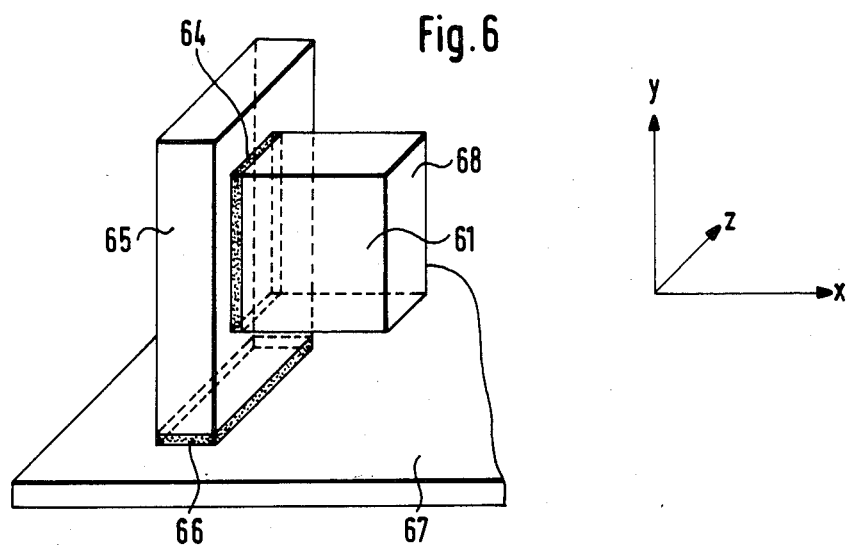

In FIGS. 5 and 6, two further embodiments are shown for mounting adjusted optical components. The optical component 51 of FIG. 5 may, for example, be a reflecting grating, the rear face of which is used as a mounting face. It is held by a manipulator at its cylindrical boundary surface. Once adjustment is completed, a first block-like assembly plate 53 is set onto the mounting face with a thin intermediate layer 52 of the self-hardening substance. A second block-like assembly plate 55 is set, with a thin intermediate layer 54 of the self-hardening substance, upon a side face of the first block-like assembly plate 53, and at the same time is mounted with a side face on the base plate 57 with a thin intermediate layer 56 of the self-hardening substance. For greater stability, a third block-like assembly plate (not shown) can be placed upon the side face 58 of the first block-like assembly plate 53 with a thin intermediate layer of the self-hardening substance, and at the same time, with a side face, this third block-like assembly plate can be placed upon the base plate 57 with an intermediate layer of the self-hardening substance.

In the embodiment shown in FIG. 5, the optical component 51 can be moved during adjustment in all three spatial directions X, Y, and Z and can be rotated about all three spatial directions. In many cases, rotation about the Z direction is not necessary, for example as with plane mirrors. For this case, FIG. 6 shows a simpler embodiment, in which a side face of the optical component 61 serves as the mounting surface. After the adjustment, the block-like assembly plate 65 is set on this side face with a thin intermediate layer 64 of the self-hardening substance. At the same time, assembly plate 65 is set, with its side face, on the base plate 67 with a thin intermediate layer 66 of the self-hardening substance. In this embodiment as well, for greater stability, a further block-like assembly plate (not shown) can be set onto the side face 68 of the optical component 61 with a thin intermediate layer of the self-hardening substance. At the same time, the further block-like assembly plate can be set onto the base plate 67 with a side face and with a thin intermediate layer of the self-hardening substance.

It is understood that the optical components need not be joined directly to the assembly blocks or assembly plate with the self-hardening substance, but instead, in all the embodiments, they can first be inserted into mounts or mounted on holder plates, and the mounts or holder plates then joined to the assembly blocks or assembly plates by means of the self-hardening substance.

As the material for the mounts, holder plates 31, assembly blocks 36, 44, 46, assembly plates 23, 53, 55, 65 and/or support surfaces 25, 38, 48, 57, 67, or frame 11, it is particularly advantageous to use compacted ceramic, its composition being selected such that its thermal coefficient of expansion is equal to or nearly equal to that of the glass from which the optical components are made. As the material of the self-hardening substance, the product UHU PLUS ENDFEST can be used, preferably in a layer thickness of approximately 0.1 mm.

It is possible to use glass as the material for the mounts, holder plates, assembly blocks, assembly plates and/or support faces or frame.

The method explained in terms of the above embodiments can be used in all optical equipment that comprises at least two optical components that have to be adjusted in relation to one another.

It is understood that the foregoing description is that of the preferred embodiments of the invention and that various changes and modifications may be made thereto without departing from the spirit and scope of the invention as defined in the appended claims.

What is claimed is:

1. Method for assembling an optical component in a frame, the optical component being connected to said frame only by means of an adjusting device, the method comprising the steps of:

providing a part disposed between said optical component and said frame so as to define a first interface spacing between said frame and said part and second interface spacing between said optical component and said part;

moving said part relative t o said frame in at least two directions of movement;

introducing a self-hardening adhesive substance into said first interface spacing which has a predetermined coeffcient of thermal expansion;

maintaining said first interface spacing during said movement so as to ensure a thickness and volume of said substance in said first interface spacing which will be substantially unaffected by any unwanted further adjustments occurring during the self-hardening process and because of thermal expansion in the fixed state after hardening thereby providing a permanent first fixation stable over time;

moving said optical component in an additional direction of movement relative to said part; and, introducing a self-hardening adhesive substance having a predetermined coefficient of thermal expansion into said second interface spacing of said part and said optical component thereby establishing a permanent second fixation independent of said first fixation, said part being configuration and dimensioned so as to provide optimal volume and layer thicknesses for said substance to prevent unwanted further adjustments from occurring to said second interface during the self-hardening process and because of thermal expansion in the fixed state after hardening thereby providing a permanent second fixation stable over time.

2. Arrangement for assembling an optical component in a frame having a mounting surface, the optical component being connected to said frame only by means of an adjusting device, the arrangement comprising:

an assembly plate having a cylindrically-shaped cutout formed therein;

said optical component having a circular cross section and defining a longitudinal axis;

said optical component also having a rim and being disposed in said cutout so as to cause said rim and the surface of said cutout to conjointly define a gap therebetween which permits said optical component to be movable in the direction of said longitudinal axis and to be rotatable about said axis;

a first quantity of a self-hardening substance disposed in said gap;

said plate defining a plane and being mounted on said mounting surface so as to be movable in at least two translational directions in said plane;

said gap having a width selected to ensure a thickness and volume of said substance to provide a permanent first fixation of said component which will be stable over time while at the same time permitting at least a limited degree of rotation about an axis lying in said plane before said substance has hardened;

said plate and said mounting surface conjointly defining an interface therebetween;

a second quantity of a self-hardening substance disposed at said interface; and, said interface having a width selected to ensure a thickness and volume of said second quantity of said self-hardening substance to provide a second permanent fixation of said optical component which will be stable over time.

3. Arrangement for assembling an optical component in a frame having a mounting surface, the optical component being connected to said frame only by means of an adjusting device, the arrangement comprising:

an assembly plate having a cylindrically-shaped cutout formed therein;

said optical component having a circular cross section and a rim and being disposed in said cutout so as to cause said rim and the surface of said cutout to conjointly define a gap therebetween;

said plate and said mounting surface of said frame conjointly defining an interface therebetween;

a first quantity of a self-hardening substance disposed in said gap to provide a first permanent fixation of said component;

a second quantity of a self-hardening substance disposed at said interface to provide a second permanent fixation of said component; and, the surface of said rim being spherically shaped so as to cause said rim to define a zone of a sphere having a radius equal to the radius of said cutout reduced by the thickness of said gap.

4. The arrangement of claim 3, wherein said optical component includes a carrier structure having said circular cross section and said rim.

5. The arrangement of claim 4, said optical component being made of glass; and, said carrier structure, said assembly plate and said frame all being made of compacted ceramic having the composition selected so as to have a thermal coefficient of expansion which is equal to or approximately equal to the thermal coefficient of expansion of said glass.

6. The arrangement of claim 5, said self-hardening substance being UHU PLUS ENDFEST and said interface and said gap each having a thickness of approximately 0.1 mm.

7. The arrangement of claim 4, said optical component being made of glass; and, said carrier structure, said assembly plate and said frame being made of glass.

8. An arrangement for assembling an optical component in a frame having a supporting surface, the optical component being connected to said frame only by means of an adjusting device, the arrangement comprising:

two mounting surfaces formed on said optical component and facing away from each other;

two assembly blocks having respective first surfaces conjointly defining respective first interfaces with corresponding ones of said mounting surfaces which permit said optical component to be moved in at least two translational directions;

two first quantities of self-hardening substance disposed at corresponding ones of said first interfaces;

said first interfaces having respective widths selected to ensure a thickness and volume of said respective first quantities of self-hardening substances to provide first permanent fixations of said optical component which will be stable over time;

said two assembly blocks having respective second surfaces conjointly defining respective second interfaces with said supporting surface which permit said optical component to be moved in at least one additional translational direction as well as being rotatable about the axis defining at least one of said translational directions;

two second quantities of self-hardening substance disposed at corresponding ones of said second interfaces; and, said second interfaces having respective widths selected to ensure a thickness and volume of said respective second quantities of self-hardening substances to provide second permanent fixations of said optical component which will be stable over time.

9. The arrangement of claim 8, wherein said optical component includes a carrier structure and said two mounting surfaces being mutually parallel mounting surfaces formed on said carrier structure.

10. An arrangement for assembling an optical component in a frame having a supporting surface, the optical component being connected t o said frame only by means of an adjusting device, the arrangement comprising:

two mounting surface formed on said optical component and facing away from each other;

two assembly blocks having respective first surfaces conjointly defining respective first interfaces with corresponding ones of said mounting surfaces;

two first quantities of self-hardening substance disposed at corresponding ones of said first interfaces to provide first permanent fixations of said component;

said two assembly blocks having respective second surfaces conjointly defining respective second interfaces with said supporting surface;

two second quantities of self-hardening substance disposed at corresponding ones of said second interfaces to provide second permanent fixations of said component;

said optical component including a carrier structure and said two mounting surfaces being mutually parallel mounting surfaces formed on said carrier structures;

said optical component being made of glass;

and, said carrier structure, said two assembly blocks and said frame all being made of compacted ceramic having the composition selected so as to have a thermal coefficient of expansion which is equal to or approximately equal to the thermal coefficient of expansion of said glass.

11. The arrangement of claim 10, said self-hardening substance being UHU PLUS ENDFEST and said interfaces each having a thickness of approximately 0.1 mm.

12. The arrangement of claim 9, said optical component being made of glass; and, said carrier structure, said assembly blocks and said frame being made of glass.

13. An arrangement for assembling an optical component in a frame having a supporting surface, the optical component being connected to said frame only by means of an adjusting device, the arrangement comprising:

two mounting surfaces formed on said optical component and facing away from each other;

two first assembly blocks having respective first surfaces conjointly defining respective first interfaces with corresponding ones of said mounting surfaces;

two first quantities of self-hardening substance disposed at corresponding ones of said first interfaces to provide first permanent fixations of said component;

said two first assembly blocks having respective sets of end faces;

two second assembly blocks having respective second surfaces for accommodating said two first assembly blocks therebetween so as to cause said end faces and said second surfaces to define four separate second interfaces;

four second quantities of self-hardening substance disposed at corresponding ones of said second interfaces to provide second permanent fixations of said component;

said two second assembly blocks having respective third surfaces conjointly defining respective third interfaces with said supporting surface; and, two third quantities of self-hardening substance disposed at corresponding ones of said third interfaces to provide third permanent fixations of said component.

14. The arrangement of claim 13, wherein said optical component includes a carrier structure and said two mounting surfaces being mutually parallel mounting surfaces formed on said carrier structure.

15. The arrangement of claim 14, said optical component being made of glass; and, said carrier structure, said frame, said first assembly blocks and said second assembly blocks all being made of compacted ceramic having the composition selected so as to have a thermal coefficient of expansion which is equal to or approximately equal to the thermal coefficient of expansion of said glass.

16. The arrangement of claim 15, said self-hardening substance being UHU PLUS ENDFEST and said interfaces each having a thickness of approximately 0.1 mm.

17. The arrangement of claim 14, said optical component being made of glass; and, said carrier structure, said frame, said first assembly blocks and said second assembly blocks being made of glass.

18. An arrangement for assembling an optical component to a base structure, the optical component being connected to said base structure only by means of an adjusting device, the arrangement comprising:

a rear mounting surface formed on said optical component;

a block-like first assembly plate having a first front surface conjointly defining a first interface with said rear mounting surface;

a first thin intermediate layer of self-hardening substance disposed at said first interface to provide a first permanent fixation of said component;

said first assembly plate having a first side surface;

a block-like second assembly plate having a second front face conjointly defining a second interface with said first side surface so as to mount said first assembly plate on said second assembly plate;

a second thin intermediate layer of self-hardening substance disposed at said second interface to provide a second permanent fixation of said component;

said second assembly plate having a second side surface conjointly defining a third interface with said base structure so as to mount said second assembly plate on said base structure; and, a third thin intermediate layer of self-hardening substance disposed at said third interface to provide a third permanent fixation of said component.

19. The arrangement of claim 18, wherein said optical component includes a carrier structure and said rear mounting surface is formed on said carrier structure.

20. The arrangement of claim 19, said optical component being made of glass; and, said carrier structure, said base structure, said first assembly plate and said second assembly plate all being made of compacted ceramic having the composition selected so as to have a thermal coefficient of expansion which is equal to or approximately equal to the thermal coefficient of expansion of said glass.

21. The arrangement of claim 20, said self-hardening substance being UHU PLUS ENDFEST and said intermediate layers each having a thickness of approximately 0.1 mm.

22. The arrangement of claim 19, said optical component being made of glass; and, said carrier structure, said base structure, said first assembly plate and said second assembly plate being made of glass.

23. An arrangement for assembling an optical component to a base structure, the optical component being connected to said base structure only by means of an adjusting device, the arrangement comprising:

said optical component having a lateral mounting surface;

a block-like assembly plate having a front surface conjointly defining a first interface with said lateral mounting surface so as to mount said optical component on said assembly plate;

a first thin intermediate layer of self-hardening adhesive substance having a predetermined coefficient of thermal expansion and being disposed at said first interface to provide a first permanent fixation of said component;

said assembly plate having a side surface conjointly defining a second interface with said base structure so as to mount said assembly plate on said base structure;

a second thin intermediate layer of self-hardening adhesive substance having a predetermined coefficient of thermal expansion and being disposed at said second interface to provide a second permanent fixation of said component; and, said interfaces having respective widths selected to ensure a thickness and volume of said self-hardening adhesive substances so as to cause said widths to be substantially unaffected by any unwanted further adjustments occurring during the self-hardening process and because of thermal expansion in the fixed state after hardening thereby ensuring that said fixations will be stable over time.

24. The arrangement of claim 23, wherein said optical component includes a carrier structure and said lateral mounting surface is formed on said carrier structure.

25. An arrangement for assembling an optical component to a base structure, the optical component being connected to said base structure only by means of an adjusting device, the arrangement comprising:

said optical component having a lateral mounting surface;

a block-like assembly plate having a front surface conjointly defining a first interface with said lateral mounting surface so as to mount said optical component on said assembly plate;

a first thin intermediate layer of self-hardening substance disposed at said first interface to provide a first permanent fixation of said component;

said assembly plate having a side surface conjointly defining a second interface with said base structure so as to mount said assembly plate on said base structure;

a second thin intermediate layer of self-hardening substance disposed at said second interface to provide a second permanent fixation of said component;

said optical component including a carrier structure and said lateral mounting surface being formed on said carrier structure;

said optical component being made of glass; and, said carrier structure, said block-like assembly plate and said base structure all being of compacted ceramic having the composition selected so as to have a thermal coefficient of expansion which is equal to or approximately equal to the thermal coefficient of expansion of said glass.

26. The arrangement of claim 25, said self-hardening substance being UHU PLUS ENDFEST and said intermediate layers each having a thickness of approximately 0.1 mm.

27. The arrangement of claim 24, said optical component being made of glass; and, said carrier structure, said block-like assembly plate and said base structure being made of glass.

* * * * *